(12) United States Patent
Hasegawa et al.

(10) Patent No.: US 8,857,042 B2
(45) Date of Patent: Oct. 14, 2014

(54) METHOD FOR PRODUCING STATOR FOR ROTARY ELECTRIC MACHINE

(75) Inventors: Takuya Hasegawa, Kariya (JP); Kazuyuki Yamaguchi, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 143 days.

(21) Appl. No.: 13/582,902

(22) PCT Filed: Mar. 10, 2011

(86) PCT No.: PCT/JP2011/055575
§ 371 (c)(1),
(2), (4) Date: Sep. 5, 2012

(87) PCT Pub. No.: WO2011/111761
PCT Pub. Date: Sep. 15, 2011

(65) Prior Publication Data
US 2013/0000105 A1  Jan. 3, 2013

(30) Foreign Application Priority Data
Mar. 12, 2010  (JP) ................................ 2010-056176

(51) Int. Cl.
*H02K 15/00* (2006.01)
*H02K 15/04* (2006.01)

(52) U.S. Cl.
CPC .................................. *H02K 15/0428* (2013.01)
USPC .................................. 29/596; 29/605; 29/606

(58) Field of Classification Search
USPC .................... 29/596, 605, 606, 732, 734, 736; 310/179, 198, 201, 208, 216.069
See application file for complete search history.

(56) References Cited

U.S. PATENT DOCUMENTS

| 6,229,241 | B1* | 5/2001 | Ishigami et al. ............... 310/208 |
| 7,275,299 | B2* | 10/2007 | Kuroyanagi et al. ........... 29/596 |
| 2006/0170303 | A1 | 8/2006 | Bosch et al. |

FOREIGN PATENT DOCUMENTS

| CN | 1227441 | 9/1999 |
| JP | 58-148643 | 9/1983 |
| JP | 11-308826 | 11/1999 |
| JP | 2004-064819 | 2/2004 |
| JP | 2007-166849 | 6/2007 |
| JP | 2007-166850 | 6/2007 |
| JP | 2009-195011 | 8/2009 |
| JP | 2009-268158 | 11/2009 |
| JP | 2009-268159 | 11/2009 |

OTHER PUBLICATIONS

China Office action, mail date is Mar. 4, 2014.
International Preliminary Report on Patentability for PCT/JP2011/055575, mailed Oct. 23, 2012.

* cited by examiner

*Primary Examiner* — Thiem Phan
(74) *Attorney, Agent, or Firm* — Greenblum & Bernstein, P.L.C.

(57) ABSTRACT

Disclosed is a method for producing a stator for a rotary electric machine, which involves preparing a stator core having a plurality of slots. Each of a plurality of coils is provided with a pair of coil ends, a first side, and a second side. The first side and/or the second side is inserted into the retaining groove of a jig, and each coil is set on the jig in a manner such that both coil ends extend further to the outside than the end surfaces of the jig in the axial direction thereof. The jig is disposed inside the stator core in the diameter direction. The space between the first side and the second side of the coil is expanded by applying pressing force to both coil ends from the axial direction of the stator core by means of a pressing member.

8 Claims, 7 Drawing Sheets

Fig.12(a) Fig.12(b)

METHOD FOR PRODUCING STATOR FOR ROTARY ELECTRIC MACHINE

TECHNICAL FIELD

The present invention relates to a manufacturing method and a manufacturing apparatus for a stator of a rotary electric machine, and more particularly to a manufacturing and a manufacturing apparatus for a stator formed by inserting first sides and second sides of a plurality of coils, which are formed in advance from conductor wires, into different slots.

BACKGROUND ART

When coupling a coil, which is formed in advance as a closed loop, to an annular stator core, which includes a plurality of radially formed slots having openings open to an inner circumference, so as to form a distributed winding, it is necessary to insert two insertion portions (sides) of each coil into two slots, which are spaced apart in the circumferential direction, while widening the insertion portions in accordance with the groove shape of the slots that widen radially.

In patent document 1, when inserting a coil, which is shaped into a turtle shell form, into slots of a stator core, straight portions of the coil are radially ejected by an ejecting piece to move the straight portions along the slots and insert the straight portion into the slots. Upper and lower end portions of the coil are both formed to be V-shaped. When the straight portions are moved along the slots, the V-shaped portions are deformed to approach the stator core. Patent document 1 describes that the cross-sections of conductor wires forming the coil do not have to be generally circular and may have other shapes, such as a rectangular shape.

Further, patent document 2 discloses a method for manufacturing a stator in which a first side of each of a plurality of coils, which are formed beforehand, is inserted into a slot of a stator core, and a second side of each of the coils is then inserted into another slot so that the coils are spirally overlapped when viewed from an end surface of the stator core. The method of patent document 2 uses a jig having an outer circumference including a plurality of slit-like holding grooves. The plurality of holding grooves include a plurality of first holding grooves, which are arranged at a pitch that is an integral multiple of the pitch of the slots in the stator core, and a plurality of second holding grooves, which are arranged at the same pitch as the first holding grooves. Further, the first side of each coil is inserted into a first holding groove, and the second side is inserted into a second holding groove, which is adjacent to the first holding groove into which the first side is inserted, and the coils are arranged along a circumference of the jig. The jig is arranged at a radially inner side of the stator core, and the first side of each of the coils is ejected outward in the radial direction by an ejecting means and inserted into the corresponding slot of the stator core. Next, the jig is rotated by a predetermined angle relative to the slots of the stator core and positioned so that the second holding grooves are aligned with the corresponding slots of the stator core. Then, the second side is ejected outward in the radial direction by the ejecting means and inserted into the corresponding slot of the stator core.

PRIOR ART DOCUMENTS

Patent Documents

Patent Document 1: Japanese Laid-Open Patent Publication No. 2009-195011

Patent Document 2: Japanese Laid-Open Patent Publication No. 2007-166849

SUMMARY OF THE INVENTION

Problem to be Solved by the Invention

When using a conductor wire that easily deforms such as a round wire, as described in the patent document 1, the straight portions of a coil may be ejected from the inner side of the stator to the outer side and be expanded along the slots. However, when the coil is formed by rectangular wires, the coil differs from a coil formed by round wires and resists deformation. Thus, the coil cannot be easily deformed only when pushing the straight portion, and the coil is required to be pushed into the slit with an extremely large force in a state in which a large friction force acts between the straight portion and a wall surface of the slot.

Further, the method of the patent document 2 is performed under the assumption that the coil is formed by easily deformed conductor wires such as round wires, and the arrangement of a bundle of the conductor wires forming the straight portions (the first side and the second side), which correspond to the portions inserted to the slots, can be changed in correspondence with the shape of the slots or the holding grooves. Accordingly, this cannot be applied to when the shapes of the first side and the second side cannot change in correspondence with the shape of the slots or the holding grooves, such as when the coils are formed by rectangular wires.

It is an object of the present invention to provide a manufacturing method and a manufacturing apparatus for a stator of an electric rotating machine that can prevent deformation and damage of a stator core even when a coil requiring a large force for deformation is inserted into a slot of the stator core while being deformed.

To achieve the above object, one aspect of the present invention is a manufacturing method of a stator for an electric rotating machine including the step of preparing an annular stator core including a plurality of slots arranged along a circumferential direction. Each of the slots includes an opening that opens in an inner circumference of the stator core, and a slot pitch between adjacent ones of the slots increases toward outside in a radial direction of the stator core. The manufacturing method includes the step of preparing the plurality of coils. Each of the coils is formed in advance from a conductor wire and includes two coil ends, a first side, and a second side. The first side and the second side are shaped to a form that fits within the slots of the stator core. The manufacturing method includes the step of preparing a jig that can be arranged at a radially inner side of the stator core. The jig includes a plurality of holding grooves, which are respectively opposed to the openings in a state arranged at the radially inner side of the stator core, and two end surfaces, which are located on two axial ends of the jig. The manufacturing method includes the step of setting each of the coils to the jig so that at least one of the first side and the second side is inserted in the holding groove of the jig and the two coil ends protrude outward in an axial direction of the jig from the two end surfaces. The manufacturing method includes the step of arranging the jig at the radially inner side of the stator core. The manufacturing method includes the step of inserting the first side and the second side into the slots of the stator core by applying a force with an ejecting portion to the coil that ejects at least one of the first side and the second side inserted in the holding groove out of the holding groove and into a corresponding one of the slots, while applying a pushing force with a pushing portion to the two coil ends from an axial direction of the stator core and increasing the distance between the first side and the second side of the coil.

Here, "shaped" refers to a state in which even when force is applied to conductive wires that are wound together in a state contacting each other, the shape of the conductive wires is sustained. For example, when bundling and using a plurality of round wires as a conductive wire in a flat state in its entirety, the term refers to the flat shape being maintained by hardening it with resin or winding an insulative sheet of synthetic resin around the outer side of the flat shape. When the conductive wire is a rectangular wire, regardless of whether flatwise or edgewise winding is performed, conductive wires wound in a state contacting each other can be maintained in the contacting state even without performing a process such as that performed on round wires. Thus, when a plurality of layers are stacked, this corresponds to a "shaped" state. Further, the "slot pitch" refers to the distance between center lines of two adjacent ones of the slots.

In this invention, the coils coupled to the stator core in a state forming distributed windings are set in a state in which the first sides and the second sides of the coils, which are formed in advance from conductive wires, are inserted in the holding grooves of the jig or one of the first sides and second sides are inserted in the holding grooves of the jig and the other one of the first sides and the second sides is inserted in the slots with the coil ends both projecting from the end surfaces at portions of the jig where the holding grooves are formed. In this state, the pushing portion applies pushing force to a coil from the axial direction of the stator core to the two coil ends to increase the distance between the first side and the second side. Further, when the ejecting portion applies force to the coil that ejects the first side and the second side out of the holding groove, the first side and the second side are ejected out of the holding grooves and into the corresponding slots to couple the coil to the stator core. The slot pitch is the smallest at where the openings of the slots are located and the larges at the bottom portions of the slots. Thus, when the first side and second side inserted in the holding grooves of the jig are simply ejected toward the slots of the stator core, the coil is moved toward the bottom portions of the slots in a state in which the distance between the first side and second side of the coil is smaller than the slot pitch. Thus, in a state in which the first side and second side are in contact with the wall surfaces of the slots, reaction force from the wall surfaces of the slots moves the first side and second side while increasing the distance therebetween. This may deform or damage the wall surfaces of the slot. However, in this invention, the pushing portion applies pushing force to the coil that increases the distance between the first side and the second side, and the ejecting pushing moves the coil toward the bottom portions of the slots. Accordingly, when inserting a coil, which requires a large force for deformation such as a coil formed from a rectangular wire, into the slot of the stator core, deformation and damage of the stator core can be prevented.

Preferably, the first sides and the second sides of the coils are both inserted in the holding grooves of the jig.

In this invention, unlike a case in which the coil is set in a state in which one of the first side and second side is inserted in a holding groove of the jig and the other one is inserted in a slot, there is no need for any special limitation to the coil shape in order to avoid interference between the coil end and the stator core during the setting.

A second aspect of the present invention is a manufacturing apparatus of a stator for an electric rotating machine that includes a jig, a supporting portion, a pushing portion, and an ejecting portion. The stator includes an annular stator core and a plurality of cores. The stator core has a plurality of slots arranged along a circumferential direction. The coils are coupled to the stator core. Each of the slots includes an opening that opens in an inner circumference of the stator core. A slot pitch between adjacent ones of the slots increases toward outside in a radial direction of the stator core. Each of the coils is formed in advance by a conductor wire and includes two coil ends and a first side and second side, which are inserted into the slots. The jig can be arranged at a radially inner side of the stator core. The jig includes a plurality of holding grooves, which are respectively opposed to the openings in a state arranged at the radially inner side of the stator core, and two end surfaces, which are located on two axial ends of the jig. The holding grooves have a pitch corresponding to a pitch of the openings. The support portion supports the stator core and the jig, which is arranged at the radially inner side of the stator core, in a concentric state. The pushing portion applies a pushing force to the two coil ends from an axial direction of the stator core in a state in which at least one of the first side and the second side is inserted in the holding groove of the jig, which is arranged at the radially inner side of the stator core, and the two coil ends protrude outward from the two end surfaces in an axial direction of the jig. The ejecting portion applies a force to the coil that ejects the sides inserted in the holding grooves out of the holding grooves and into the corresponding slots.

The present invention provides a manufacturing method and a manufacturing apparatus for a stator of an electric rotating machine that can prevent deformation and damage of a stator core even when a coil requiring a large force for deformation is inserted into a slot of the stator core while being deformed.

BRIEF DESCRIPTION OF THE DRAWINGS

FIG. 12(*c*) is a partial schematic perspective view showing a conductor wire in another embodiment.

DETAILED DESCRIPTION OF THE PREFERRED EMBODIMENTS

One embodiment for manufacturing a stator in which coils are coupled in a lap winding to a stator core in accordance with the present invention will now be described with reference to FIGS. 1 to 9.

Figure 1:
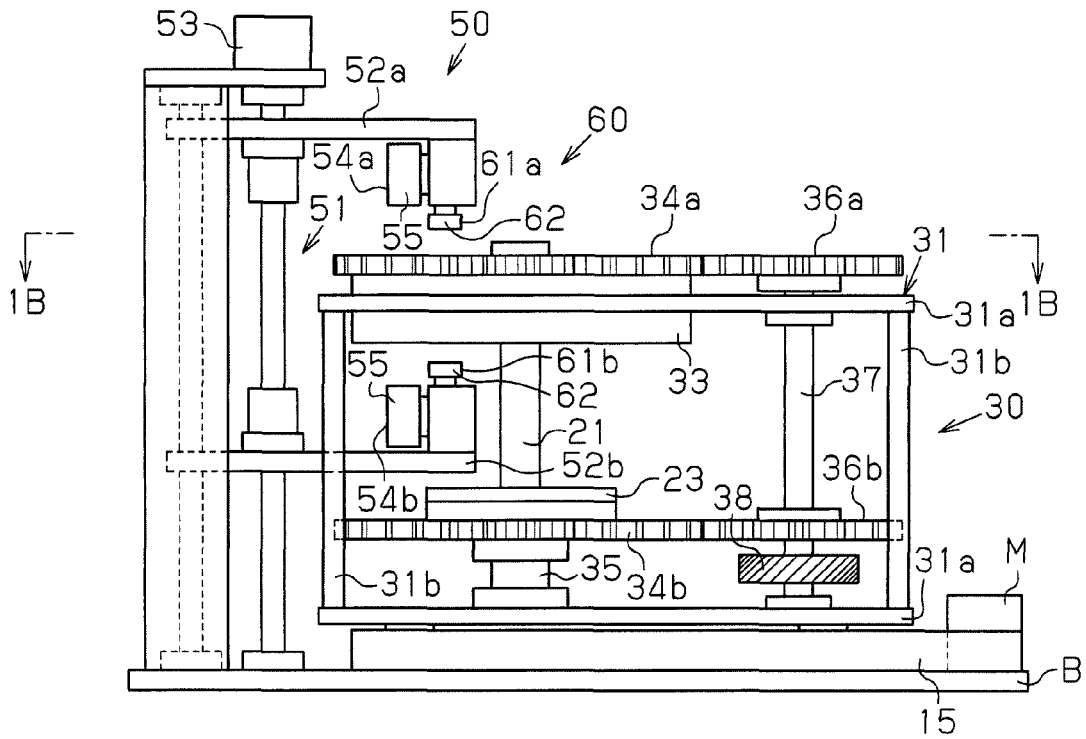
FIG. 1(a) is a schematic front view of a manufacturing apparatus for a stator according to one embodiment of the present invention.
FIG. 1(b) is a cross-sectional view taken along line 1B-1B in FIG. 1(a)
Figure 1:
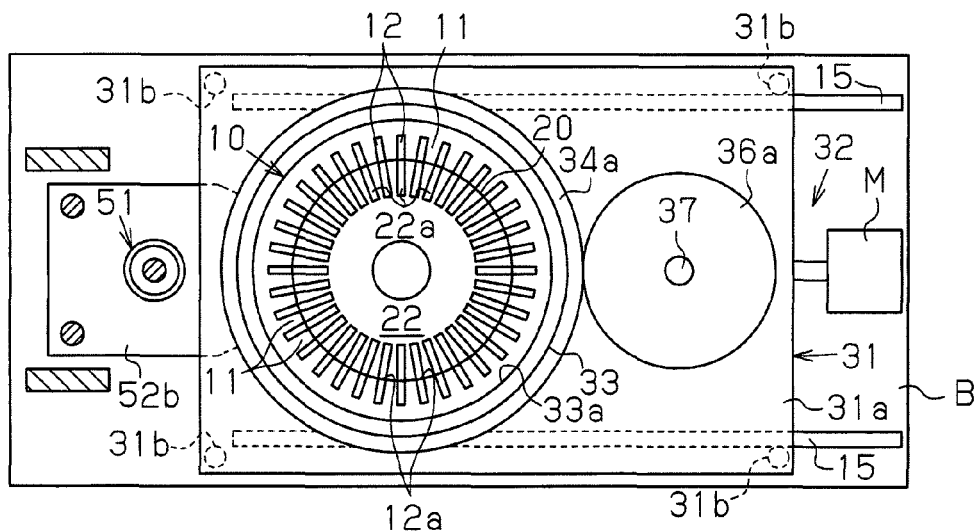

As shown in FIGS. 1(*a*) and 1(*b*), a manufacturing apparatus for a stator includes a support portion 30, which supports a stator core 10 and a jig 20, a pushing portion 50, which applies pushing force to a coil (shown in FIG. 3) 40, and an ejecting portion 60, which applies a force in a radial direction of the stator core 10 to the coil 40 that is in a state pushed and deformed by the pushing portion 50.

The stator core 10 is annular and has an inner circumference including a plurality of teeth 11 arranged in fixed intervals. A center line of each tooth 11 lies along a straight line extending radially from the center of the stator core 10. A slot 12 is formed between adjacent one of the teeth 11. In detail, each of the slots 12 has an opening 12*a* that opens in the inner circumference of the stator core 10. The stator core 10 has a slot pitch that widens from the openings 12*a* toward their bottom portions (i.e., outward in the radial direction of the stator core 10). The slot pitch refers to the distance between the center lines of two adjacent ones of the slots 12.

Figure 2:
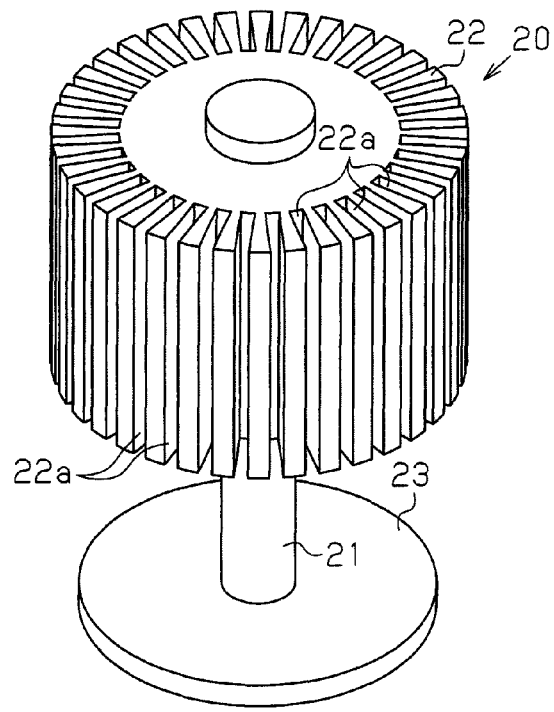
FIG. 2 is a schematic perspective view of a jig.

As shown in FIG. 2, the jig 20 includes a support column 21 and a main body 22, which is generally cylindrical and fixed to an upper end of the support column 21. A lower end of the support column 21 includes a disk-shaped fixing portion 23, which fixes the jig 20 to the support portion 30. The main body 22 has an outer circumferential surface including a plurality of holding grooves 22*a*, which extend in a radial direction of the main body 22. The pitch of two adjacent ones of the holding grooves 22*a* corresponds to the pitch of the openings 12*a* (i.e., is the same as the pitch of the openings 12*a*). Further, the jig 20 can be arranged inward in the radial direction of the stator core 10 in a state in which the holding grooves 22*a* are respectively opposed to the openings 12*a* of the slots 12 of the stator core 10.

The support portion 30 can support the stator core 10 and the jig 20, which is arranged therein, in a concentric state. In detail, the support portion 30 includes a support frame 31, which is linearly movable along a rail 15 arranged on a base B, and the support frame 31 can be reciprocated by a drive portion 32. The drive portion 32 reciprocates the support frame 31 with a ball screw mechanism (not shown) which is driven by a motor M.

The support frame 31 includes two support plates 31*a*, an upper one and a lower one, and four support columns 31*b*, which connect the support plates 31*a*. A support body 33, which accommodates and supports the stator core 10 and the jig 20, is supported to be rotatable relative to the upper support plate 31*a*. The support body 33 is generally cylindrical and has a closed end, and a gear body 34*a* is fixed to the outer circumference of the support body 33. The support body 33 includes a hole through which the fixing portion 23 of the jig 20 can be extended. A rotating shaft 35 is arranged on the lower support plate 31*a* extending in the vertical direction coaxially with the gear body 34*a*. A gear body 34*b* having the same diameter and the same number of teeth as the gear body 34*a* is fixed to an upper portion of the rotating shaft 35 to be rotated integrally with the rotating shaft 35. The fixing portion 23 of the jig 20 is coupled in a removable manner to an upper surface of the gear body 34*b*. The support frame 31 includes a rotating shaft 37. Gears 36*a* and 36*b*, which are respectively engaged with the gear bodies 34*a* and 34*b*, are fixed to the rotating shaft 37. A worm wheel 38 is fixed to and rotated integrally with the rotating shaft 37. Further, the worm wheel 38 is rotated by a worm (not shown), which is driven manually or by a motor, thereby rotating the rotating shaft 37. The rotation of the rotating shaft 37 rotates the support body 33 and the jig 20 with the gears 36*a* and 36*b* and the gear bodies 34*a* and 34*b*. The support body 33 and the jig 20 are separated. However, the gear bodies 34*a* and 34*b* are rotated at the same rotating speed. Thus, support body 33 and the jig 20 are rotated at the same rotating speed.

Figure 3A:
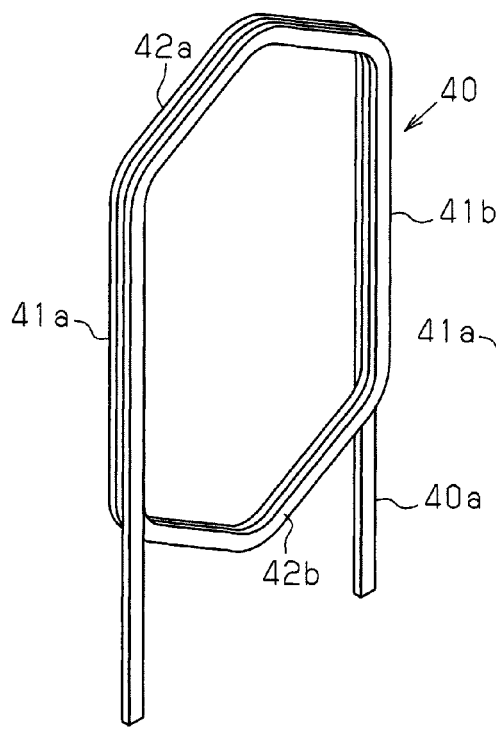
FIG. 3(a) is a schematic perspective view of a coil.
Figure 3B:
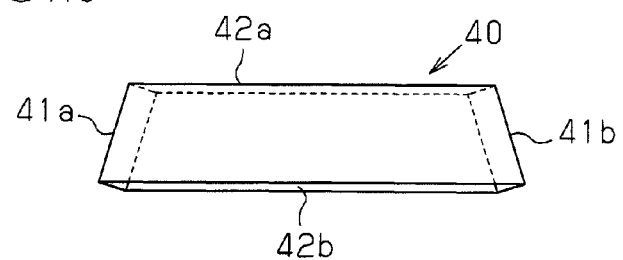
FIG. 3(b) is a schematic plan view of the coil.

As shown in FIG. 3(*a*), the coil 40 is formed by edgewise winding a rectangular wire, which serves as a conductor wire 40*a*, into a turtle shell form elongated in the vertical direction. The coil 40 includes a first side 41*a* and a second side 41*b*, which are straight portions extending parallel to each other, and coil ends 42*a* and 42*b*, which are continuous with the first side 41*a* and the second side 41*b*, and bent into ridges extending in opposite directions. In other words, the two coil ends 42*a* and 42*b* are formed to have bulging shapes. The first side 41*a* and the second side 41*b* are formed to be longer than the axial length of the stator core 10. In a state in which the first side 41*a* and the second side 41*b* are inserted (accommodated) in the slots 12, end portions of the first side 41*a* and the second side 41*b* protrude from end surfaces of the stator core 10. In FIG. 3(*a*), the coil 40 is shown with a simple turtle shell form but is actually formed in a state in which the coil ends 42*a* and 42*b* are twisted (twisting not shown in the drawings). Accordingly, when considering the first side 41*a*, the second side 41*b*, and the coil ends 42*a* and 42*b* as one member, the coil 40 is formed so that surfaces on the opposite sides of the first side 41*a* and the second side 41*b* are tapered as shown in FIG. 3(*b*). Further, the rectangular wire is coated to be insulative.

As shown in FIG. 1(*a*), the pushing portion 50 includes two lifting support bodies 52*a* and 52*b*, which can be lifted and lowered by a ball screw mechanism 51 arranged on the base B. The lifting support bodies 52*a* and 52*b* are synchronously movable in opposite directions. More specifically, when the lifting support body 52*a* is lifted, the lifting support body 52*b* is lowered, and when the lifting support body 52*a* is lowered, the lifting support body 52*b* is lifted. The ball screw mechanism 51 lowers the lifting support body 52*a* and lifts the lifting support body 52*b* when driven by the forward rotation produced by the motor 53. Further, the ball screw mechanism 51 lifts the lifting support body 52*a* and lowers the lifting support body 52*b* when driven by the reverse rotation of the motor 53.

The lifting support bodies 52*a* and 52*b* support pushing bodies 54*a* and 54*b*, respectively. The pushing bodies 54*a* and 54*b* are each formed by a roller 55, and the roller 55 is supported to be rotatable by a support shaft projecting generally parallel to the lifting support bodies 52*a* and 52*b*.

The pushing body 54*a* moves away from the support body 33 when the lifting support body 52*a* is lifted and moves toward the support body 33 when the lifting support body 52*a* is lowered. The pushing body 54*b* moves away from the support body 33 when the lifting support body 52*b* is lowered and moves toward the support body 33 when the lifting support body 52*b* is lifted. Further, horizontal movement of the support frame 31 relatively moves the pushing bodies 54*a* and 54*b* to a position opposed to the support body 33 and a position not opposed to the support body 33.

The pushing bodies 54a and 54b are arranged at a standby position, at which the pushing bodies 54a and 54b are separated from and opposed to the coil ends 42a and 42b of the coil 40 (shown in FIG. 3) arranged between the stator core 10 and the jig 20 that are accommodated in an accommodation portion 33a, and an actuation position, at which the pushing bodies 54a and 54b come into contact with the coil ends 42a and 42b and apply a pushing force acting to compress the coil 40 from the upward and downward directions. In other words, the pushing bodies 54a and 54b form sections where force is applied to the coil 40. In the pushing portion 50, the sections where force is applied to the coil 40 are rotatable about axes extending in an axial direction of the stator.

The ejecting portion 60 includes ejecting bodies 61a and 61b, which are respectively supported by the lifting support bodies 52a and 52b of the pushing portion 50. The ejecting bodies 61a and 61b are formed by rollers 62. The rollers 62 are rotatably supported by support shafts projecting vertically from the lifting support bodies 52a and 52b, respectively. The ejecting bodies 61a and 61b are formed so that that they can apply force to the coil 40 that ejects the first side 41a and the second side 41b out of the holding grooves 22a and into the corresponding slots 12 in a state in which the coil 40 is pushed and deformed by the pushing bodies 54a and 54b of the pushing portion 50. In detail, the ejecting bodies 61a and 61b are coupled to the lifting support bodies 52a and 52b so that the rollers 62 can contact the coil ends 42a and 42b of the coil 40 from the central side of the jig 20 when the pushing bodies 54a and 54b are arranged at the actuation position.

A method for manufacturing a stator with the manufacturing apparatus described above will now be described.

Figure 4A:
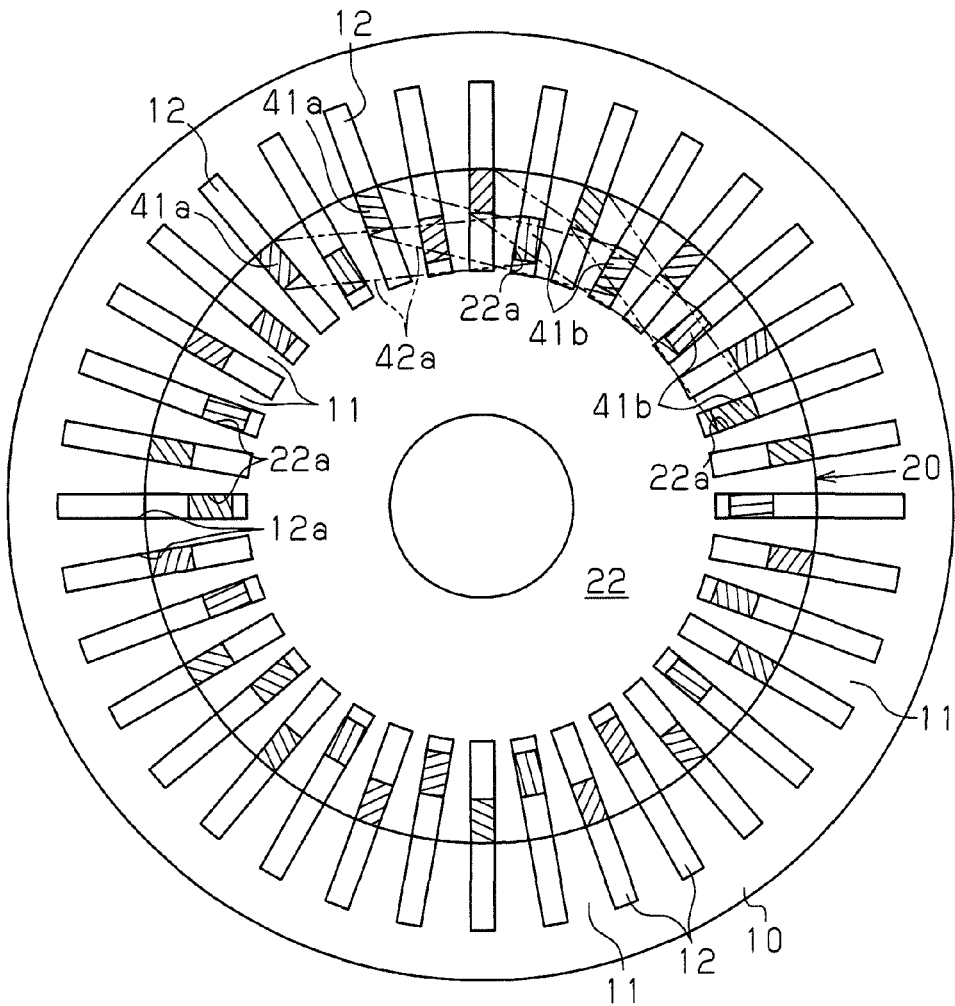
FIG. 4(a) is a schematic plan view showing a state in which the jig to which the coils are inserted is arranged in an inner side of a stator core.
Figure 4B:
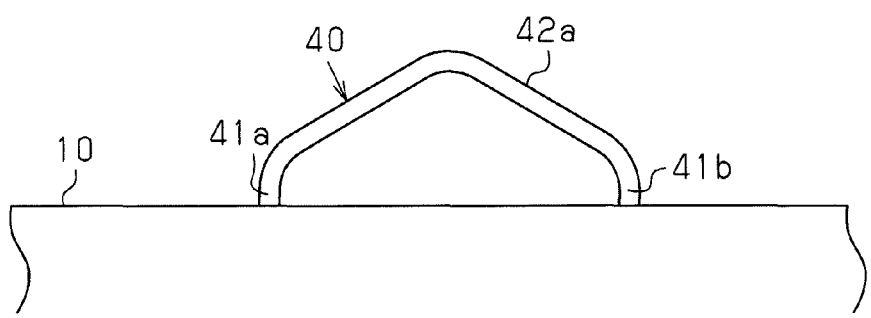
FIG. 4(b) is a schematic view showing a protruding state of a coil end at one side.

First, in a state in which the jig 20 is removed from the support portion 30, the first sides 41a and the second sides 41b of the coils 40 are inserted into the holding grooves 22a so that the coil ends 42a and 42b substantially extend along the outer circumference of the main body 22. As shown in FIG. 4, each coil 40 is held by the jig 20 in a state in which the first side 41a is located at a portion closer to an opening of the holding groove 22a, and the second side 41b is located at a portion (inner side) closer to a bottom portion of the holding groove 22a. The coil ends 42a and 42b of each coil 40 are formed so as not to interfere with the adjacent coil ends 42a and 42b. Further, each coil 40 is set in a state in which the coil ends 42a and 42b both protrude from the two end portions of the corresponding holding grooves 22a, that is, a state protruding outward from the two end surfaces of the main body 22.

Next, in a state in which the pushing bodies 54a and 54b and the ejecting bodies 61a and 61b are arranged at positions that are not opposed to the support body 33, the jig 20, to which the coils 40 are coupled in the state described above, is coupled to the support body 33 from the upper side. In detail, the jig 20 is inserted into the accommodation portion 33a from the side of the fixing portion 23, and the fixing portion 23 is fixed to the upper surface of the gear body 34b in a state in which the support column 21 protrudes downward from the support body 33.

Next, the stator core 10 is lowered in a state coaxial with the jig 20 and inserted into the accommodation portion 33a.

Figure 5:
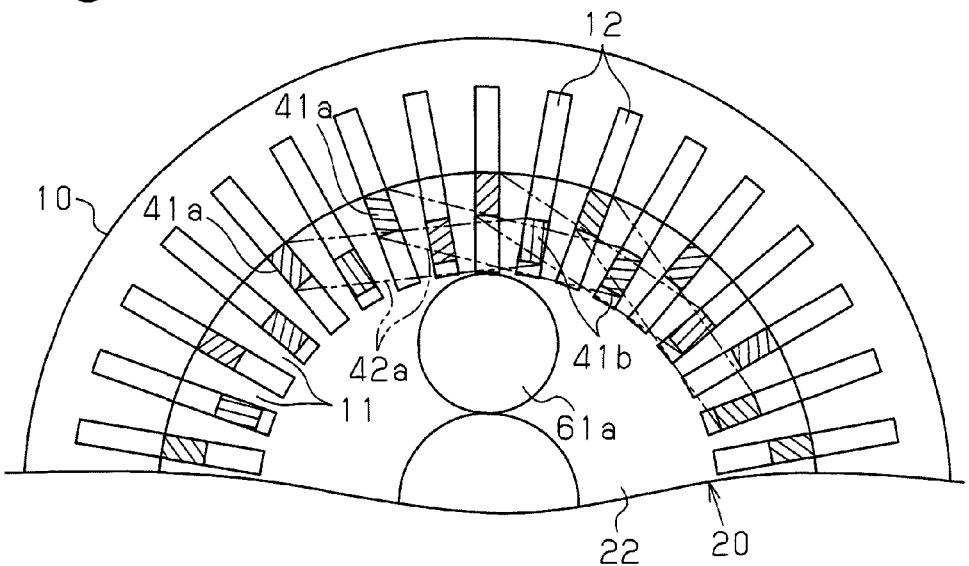
FIG. 5 is a schematic view showing the relationship between an ejecting body and the coils when starting an insertion task.

Next, the support frame 31 is moved to a position at which the pushing bodies 54a and 54b and the ejecting bodies 61a and 61b become opposed to the support body 33. When the motor 53 is driven to produce forward rotation in this state, the upper lifting support body 52a is lowered, and the lower lifting support body 52b is lifted. Further, as shown by the double-dashed lines in FIG. 6(a), when the pushing bodies 54a and 54b respectively come into contact with the bulges in the coil ends 42a and 42b of the coil 40, the ejecting body 61a comes into contact with the coil end 42a of one coil 40 from the central side of the jig 20, that is, the bottom portion side of the holding groove 22a, as shown in FIG. 5. Further, although not shown in the drawings, the lower ejecting body 61b contacts the coil end 42b from the central side of the jig 20, that is, the bottom portion side of the holding groove 22a. When the lowering of the upper lifting support body 52a and the lifting of the lower lifting support body 52b further continues, the pushing bodies 54a and 54b of the pushing portion 50 apply pushing force to the two coil ends 42a and 42b from the axial direction of the stator core 10, as shown by the solid lines in FIG. 6(a). This increases the distance between the first side 41a and the second side 41b in the coil 40.

Further, from when the ejecting bodies 61a and 61b come into contact with the coil ends 42a and 42b, the support frame 31 is moved away from the ball screw mechanism 51 in synchronism with the movement of the lifting support bodies 52a and 52b. Further, the force applied by the ejecting bodies 61a and 61b to the coil ends 42a and 42b acts to move the first side 41a and the second side 41b of the coil 40 in the radial direction of the stator core 10 and the jig 20.

A slot pitch of the stator core 10 is the narrowest (smallest) at the openings 12a of the slots 12 widest (largest) at the bottom portions of the slots 12, and the holding grooves 22a of the jig 20 extend along lines extended from the slots 12. Accordingly, when force directed in the radial direction from the axis of the stator core 10 is simply applied to the coil 40 without the distance between the first side 41a and the second side 41b being changed, the first side 41a and the second side 41b would be arranged outside the slot 12 as shown by the double-dashed lines in FIG. 7(b). However, the first side 41a and the second side 41b of the coil 40 are actually guided by the wall surfaces of the slots 12 and the holding grooves 22a and moved toward the bottom portions of the slots 12. Here, the force increasing the distance between the first side 41a and the second side 41b of the coil 40 is applied to the first side 41a and the second side 41b from the wall surfaces of the slots 12 and the holding grooves 22a. This produces a reaction force applied to the wall surfaces of the slots 12 and the holding grooves 22a from the first side 41a and the second side 41b. The force required for increasing the distance between the first side 41a and the second side 41b is large. Accordingly, when the first side 41a and the second side 41b slide in a state in which a large force is applied between the first side 41a and second side 41b and the wall surfaces of the slots 12 and holding grooves 22a, the wall surfaces of the slots 12 and the holding grooves 22a may be deformed or damaged, and an insulative coating of the coil 40 may fall off.

Figure 7A:
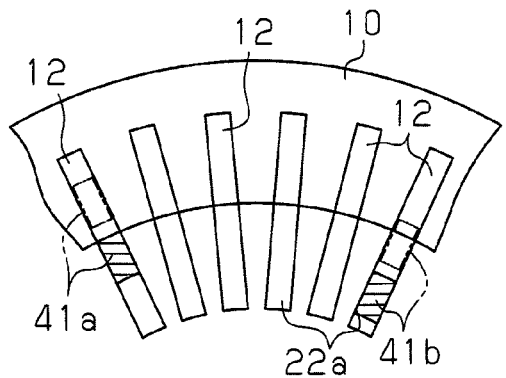
FIGS. 7(a) and 7(b) are schematic views showing the actions produced during insertion.
Figure 7B:
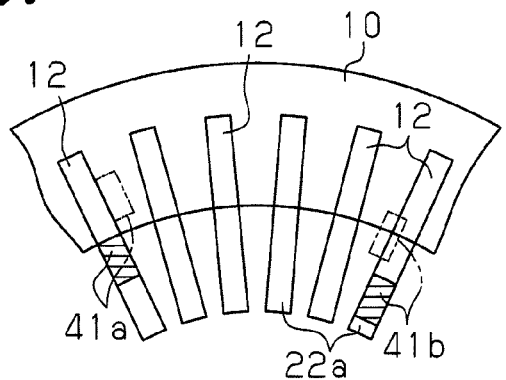

However, in this embodiment, the coil 40 is moved toward the bottom portions of the slot 12 by the ejecting bodies 61a and 61b as the pushing force of the pushing bodies 54a and 54b increase the distance between the first side 41a and the second side 41b of the coil 40. Thus, as shown in FIG. 7(a), the first side 41a and the second side 41b are smoothly moved in the direction in which the slots 12 extend. Accordingly, even when deforming and inserting the coil 40, which is formed by a rectangular wire and requires a large force for deformation, into the slots 12 of the stator core 10, deformation and damage of the stator core 10 and removal of an insulative coating from the coil 40 are prevented.

The pushing portion 50 and the ejecting portion 60 do not move the first side 41a and the second side 41b of the coil 40 to a final insertion (accommodation) position in the slots 12 through a single task. A number of tasks are required for movement to the final insertion position. Further, the tasks of the pushing portion 50 and the ejecting portion 60 are interrupted when the pushing bodies 54a and 54b are moved in the pushing direction by an amount corresponding to a single task.

The gear bodies 34a and 34b are rotated by a predetermined angle in this state, and the stator core 10 and the jig 20 are rotated together with the support body 33. Further, the next coil 40 subject to the operation of the pushing portion 50 and the ejecting portion 60 moves at it undergoes the pushing operation of the pushing bodies 54a and 54b and the ejecting operations of the ejecting bodies 61a and 61b. As a result, the first side 41a and the second side 41b of the next coil 40 are moved by a predetermined amount toward the bottom portions of the slots 12. The same tasks are repeated afterward throughout the entire circumference so that each coil 40 undergoes a single pushing and ejecting task.

Next, the motor 53 is driven to produce a predetermined amount of forward rotation. This lowers the upper lifting support body 52a and lifts the lower lifting support body 52b. In synchronism with the movement of the lifting support bodies 52a and 52b, the ejecting bodies 61a and 61b are moved by a predetermined amount in a direction in which the support frame 31 moves away from the ball screw mechanism 51. Further, in the same manner as described above, a coil 40 is moved toward the bottom portion of the slot 12 by the ejecting bodies 61a and 61b as the pushing force of the pushing bodies 54a and 54b increase the distance between the first side 41a and the second side 41b. Subsequently, the stator core 10 and the jig 20 are rotated together with the support body 33 in the same manner as described above to perform a second pushing and ejecting task on each coil 40.

Figure 8:
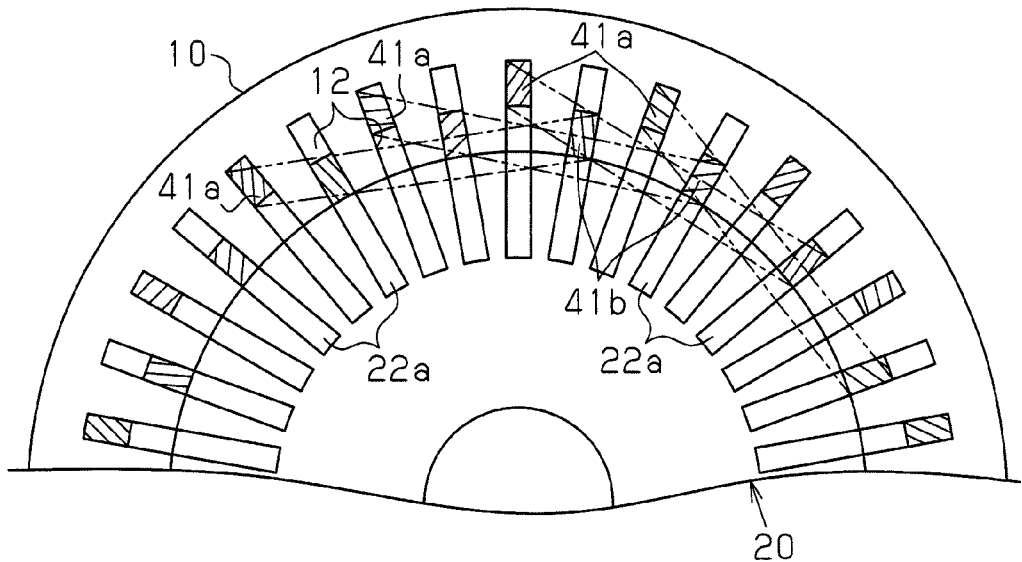
FIG. 8 is a schematic plan view showing a state in which a first side reaches a bottom portion of a slot.

The repetition of this task for a number of times results in a state in which the first sides 41a reach the bottom portions of the slot 12, as shown in FIG. 8. Then, the second sides 41b are moved by the pushing bodies 54a and 54b until the second sides 41b reach the bottom portions of the slots 12.

Figure 9:
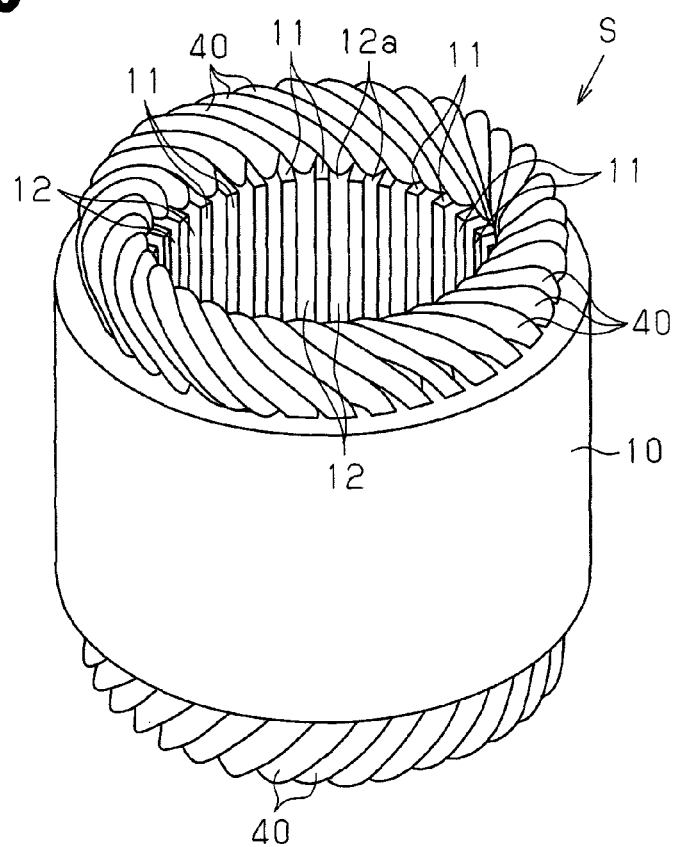
FIG. 9 is a schematic perspective view of the stator.

Then, after moving the pushing bodies 54a and 54b and the ejecting bodies 61a and 61b to positions where they do not interfere with the removal of the stator core 10 from the support body 33, the stator core 10, in which the coils 40 are inserted at predetermined positions in the slots 12, is removed from the support body 33. Subsequently, the ends of the conductor wires 40a of the coils 40 are connected. This completes a stator S, as shown in FIG. 9.

The present embodiment has the advantages described below.

(1) The stator manufacturing method uses the jig 20, which can be arranged in inside the stator core 10 in a state in which the holding grooves 22a are opposed to the openings 12a of the slots 12 in the stator core 10. Further, the coil 40 is formed in advance from the conductor wire 40a including at least a portion (the first side 41a and the second side 41b) that fits within the slots 12 of the stator core 10. Further, each coil 40 is set with the first side 41a and the second side 41b inserted in the holding grooves 22a of the jig 20, which is arranged inside the stator core 10, and the coil ends protruding out of the two end portions of the holding groove 22a. In this state, the pushing portion 50 applies pushing force to both of the coil ends 42a and 42b from the axial direction of the stator core 10 to increase the distance between the first side 41a and the second side 41b of the coil 40. Further, the ejecting portion 60 applies force to the coil 40 ejecting the first side 41a and the second side 41b out of the holding grooves 22a and inserting the first side 41a and the second side 41b into the corresponding slots 12. Accordingly, the application of force to the stator core 10 is suppressed when the coils 40 are deformed. This prevents deformation and damage of the stator core 10 and prevents removal of an insulative coating from the conductor wires 40a even when inserting and deforming the coils 40, which are formed by rectangular wires and required a large force for deformation.

(2) When the coils 40 are deformed, excessive force is not applied to the jig 20, specifically, the wall surfaces of the holding grooves 22a. This decreases the strength required for the jig 20 and increases the design freedom of the motor. This because when the diameter of the motor using the stator S is small or when the number of coils is increased, the thickness between the holding grooves 22a of the jig 20 decreases and reduces the strength. This must be taken into consideration when designing the motor. However, when excessive force is not applied to the wall surfaces of the holding groove 22a, such considerations are not necessary.

(3) The rectangular wire is used as the conductor wire 40a forming the coil 40. This improves the space factor of the coil 40 in comparison with when the coil 40 uses a conductor wire 40a having a circular cross-section or an elliptic cross-section.

(4) The coil 40 is formed so that the coil ends 42a and 42b are both shaped to be bulging. As the coil 40, for example, when using a coil 40 having the bulging shape formed on only the coil end 42a and applying pushing force to both of the coil ends 42a and 42b with the pushing portion 50 from the axial direction of the stator core 10, the distance between the first side 41a and the second side 41b of the coil 40 will be increased. However, when a coil 40 has both of its coil ends shaped to be bulging, the distance between the first side and second side can easily be increased while the first side and second side remain parallel.

(5) The pushing force of the pushing portion 50 and the ejecting force of the ejecting portion 60 are applied in a manner divided into parts. Accordingly, in comparison with when the pushing force and the ejecting force are applied to the entire circumference at the same time, the load applied to the pushing portion 50 and the ejecting portion 60 is decreased. Thus, the apparatus can be reduced in size.

(6) The coils 40 are inserted in the entire circumference by the pushing force of the pushing portion 50 and the ejecting force of the ejecting portion 60 applied in a manner divided into parts. Further, the insertion of the coils 40 is completed by going around the circumference not once but a number of times. That is, the stator core 10 and the jig 20 are rotated a number of times to complete the insertion of the coils 40. Accordingly, the coils 40 are moved smoothly in comparison to when moving each coil 40 to the predetermined position with a single pushing and ejecting operation.

(7) The ejecting portion 60 includes the ejecting bodies 61a and 61b, which are formed by the rollers 62. In other words, the ejecting portion 60 is formed to be rotatable at portions applying force to the coils 40. Accordingly, when friction force increase at a portion applying force to the coil 40 that is in contact, the portion is moved and another portion comes into contact with the coil 40. This suppresses stress caused by friction and suppresses the advancement of wear at a particular portion.

(8) The pushing portion 50 includes the pushing bodies 54a and 54b that are formed by the rollers 55 so that portions applying force to the coils 40 are rotatable. Accordingly, when the frictional force increases at the portion applying force to the coil 40 that is in contact, the portion is moved and another position comes into contact with the coil 40. This suppresses stress caused by friction and suppresses the advancement of wear at a particular portion.

(9) The drive portion that lifts and lowers the lifting support bodies 52a and 52b is driven by the motor 53, and the drive portion that moves the ejecting bodies 61a and 61b relative to the stator core 10 and the jig 20 is driven by the motor M. Accordingly, this facilitates the synchronization of the operation of the pushing portion 50 that applies pushing force to the two coil ends 42a and 42b from the axial direction of the stator core 10 to increase the distance between the first side 41a and the second side 41b with the operation of the ejecting portion 60 that applies force to the coil 40 ejecting the second side 41b out of the holding groove 22a and into the corresponding slot 12.

(10) The coils 40 are set in a state inserted in the holding grooves 22a so that the first sides 41a are located near the openings of the holding grooves 22a and the second sides 41b are located near the bottom portions of the holding grooves 22a. Accordingly, in comparison with when the coils 40 are set in a state inserted in the holding grooves 22a of the jig 20 so that the first sides 41a and the second sides 41b are both located near the openings of the holding grooves 22a, the freedom increases for the shape of the coil ends 42a and 42b allowing for the jig 20 to be arranged at the inner side of the stator core 10.

The embodiment is not limited to the foregoing description and may be modified, for example, as described below.

The ejecting portion 60 only needs to apply force that moves the first side 41a and the second side 41b toward an inner side (bottom side) of the slots 12. For example, the ejecting portion may apply force to only one of the two coil ends 42a and 42b. In other words, one of the ejecting bodies 61a and 61b may be omitted.

Figure 10A:
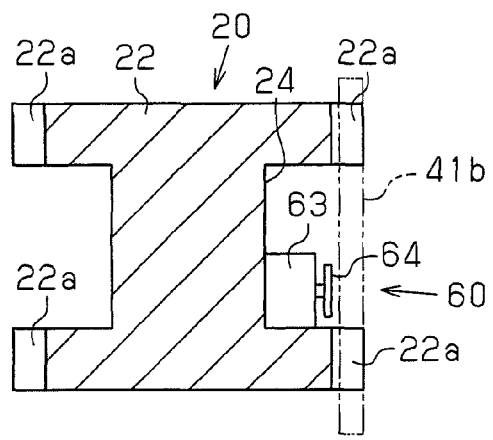
FIG. 10(a) is a schematic cross-sectional view showing the arrangement of an ejecting portion in a further embodiment.

The ejecting portion 60 may be formed to apply force to the first side 41a and the second side 41b instead of the coil ends 42a and 42b. For example, as shown in FIG. 10(a), the main body 22 may include an accommodating portion 24 that accommodates the ejecting portion 60, and the ejecting portion 60 may be arranged in the accommodating portion 24. As the ejecting portion 60, for example, a solenoid 63 may be used, and an ejecting body 64 may be arranged on a distal end of a plunger of the solenoid 63. The ejecting body 64 only needs to contact at least one of the first side 41a and the second side 41b of a single coil 40. In a structure in which the pushing portion 50 simultaneously applies pushing force to a plurality of adjacent coils 40, the ejecting body 64 is also formed so that it can simultaneously contact and apply ejecting force to a plurality of coils 40.

Figure 10B:
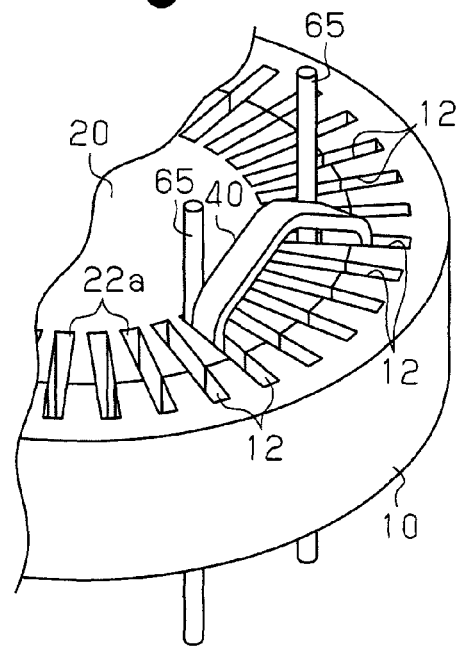
FIG. 10(b) is a schematic perspective view of an ejecting portion in the further embodiment.

The ejection from the holding grooves 22a of the second side 41b by the ejecting portion 60 may be performed by a pulling device (not shown) arranged outside the jig 20 to pull a pulling tool 65, which is set inward in the holding grooves 22a from the coil 40, as shown in FIG. 10(b). As the pulling tool 65, a cord, a rod, a plate, or the like may be used. The pulling device is arranged near the two end surfaces of the stator core 10 and pulls the pulling tool 65 with a hook that is movable back and forth in the radial direction. Further, a member having a structure similar to that of the pulling tool 65 may be ejected by the ejecting portion 60, which is arranged inward from the holding grooves 22a of the jig 20.

The ejecting bodies 61a and 61b do not necessarily have to be rotatable at locations such as the rollers 62 where force is applied to the coil 40 as long as they can diagonally come into contact with the coil 40 and suppress stress caused by the friction with the coil 40. For example, the ejecting bodies 61a and 61b may be formed by plates such as spatulas. Further, the locations applying force to the coil 40 may be formed to be rotatable, and members including a plurality of ridges and valleys such as gear or a Caterpillar may be used.

Figure 6A:
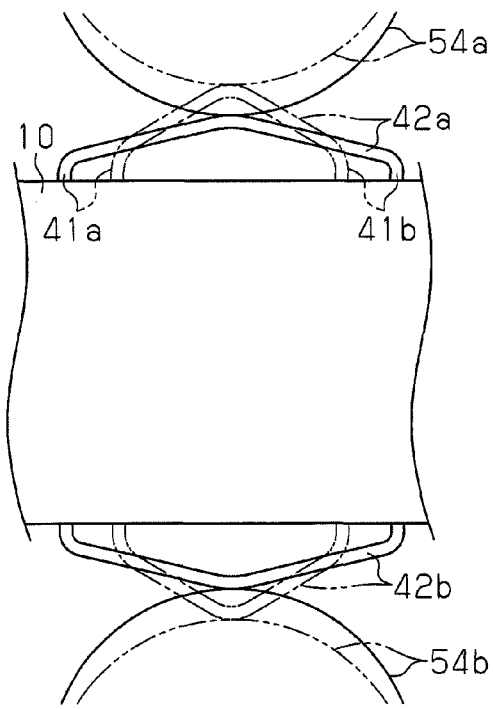
FIG. 6(a) is a schematic view showing a pushing action of the coil produced by a pushing body.
Figure 6B:
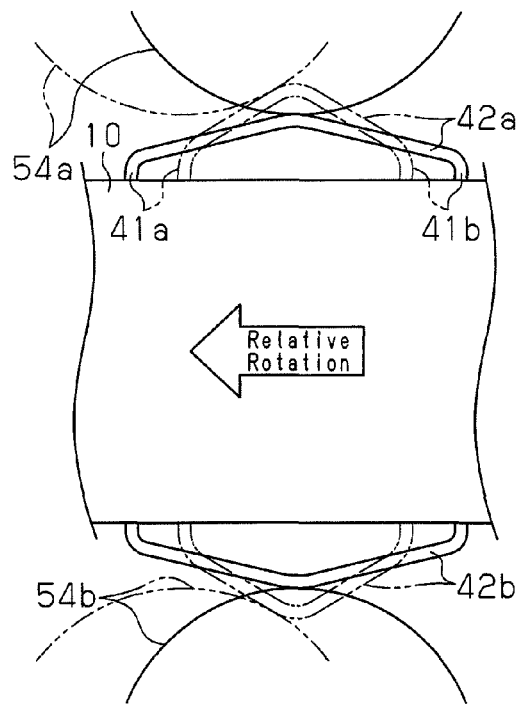
FIG. 6(b) is a schematic view showing a pushing method in another embodiment.

When pushing force is applied to the coil 40 by the pushing bodies 54a and 54b, first, as shown in FIG. 6(a), the pushing bodies 54a and 54b are moved in the axial direction of the jig 20 and the stator core 10 to push the coil ends 42a and 42b. Then, as shown in FIG. 6(b), the jig 20 and the stator core 10 may be rotated to push the coil 40 with the relative movement of the pushing bodies 54a and 54b. Further, when rotated a number of times in the state in FIG. 6(b), the positions of the pushing bodies 54a and 54b may be further changed in the direction the jig 20 and the stator core 10 are pushed in correspondence with the rotation.

The pushing bodies 54a and 54b do not necessarily have to be formed to rotatable at locations such as the rollers 55 where force is applied to the coil 40 and may be plate members or block bodies.

Figure 11:
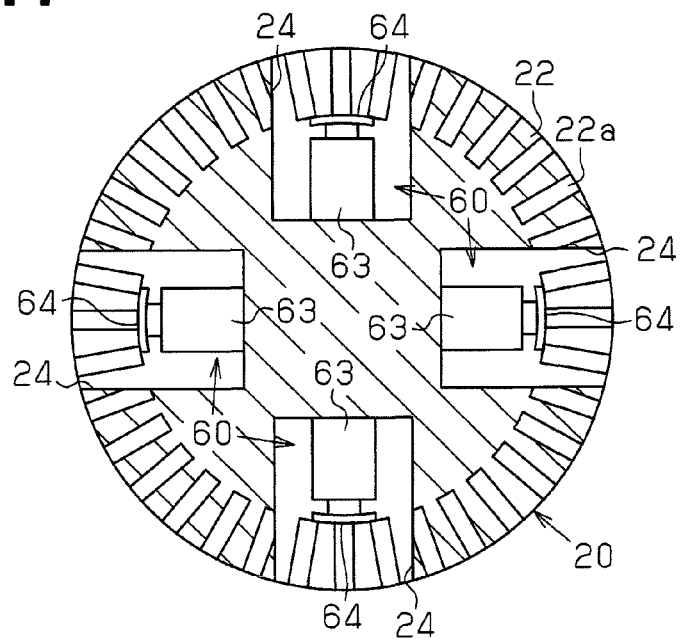
FIG. 11 is a schematic view of an ejecting portion in another embodiment.
Figure 11:
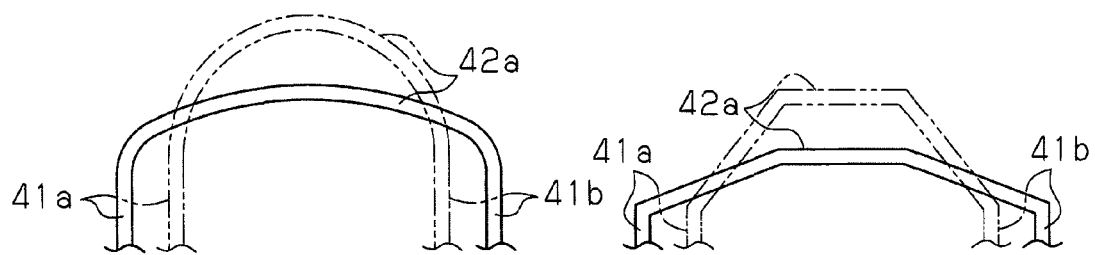

When the application of the pushing force by the pushing portion 50 and the application of the ejecting force by the ejecting portion 60 are performed in a partial manner, the ejecting portion 60 may be provided at a plurality of locations on the jig 20. For example, as shown in FIG. 11, the accommodating portion 24, which accommodates the ejecting portion 60, may be formed at four positions at equal intervals in the circumferential direction on the main body 22 of the jig 20, and the ejecting portion 60 may be arranged in each accommodating portion 24. For example, the solenoid 63 is used as the ejecting portion 60, and the ejecting body 64 is arranged on the distal end of a plunger of the solenoid 63. Further, the upper and lower support body 33 may both include four pushing portions 50 arranged at equal intervals in the circumferential direction of the support body 33. This differs from when the pushing portion 50 is arranged at one location in that rotation of the stator core 10 and the jig 20 by 90 degrees allows for the application of the pushing force and the application of the ejecting force over the entire circumference of the stator core 10.

The application of the pushing force by the pushing portion 50 and the application of the ejecting force by the ejecting portion 60 may be performed at the same time on the entire circumference. For example, as the ejecting bodies, a plurality of circular arc-shaped ejecting bodies are arranged inward from the holding grooves 22a of the jig 20. The ejecting bodies are circumferentially arranged in a partially overlapping manner as viewed from above. The ejecting bodies are all moved outward in the radial direction of the jig 20 to apply ejecting force at the same time to the entire circumference. As a drive portion that drives each ejecting body, a structure using a rotating cam or a structure driven by a hydraulic cylinder may be used. This differs from when the application of the pushing force and the application of the ejecting force are sequentially performed on parts of the coils 40 arranged over the entire circumference of the stator core 10 in that there is no need to relatively rotate the pushing portion 50 and the ejecting portion 60 to locations corresponding to the coils 40 where the pushing force and the ejecting force are applied. In other words, the structure that rotates the support body 33 becomes unnecessary.

When the application of the pushing force by the pushing portion 50 and the application of the ejecting force by the ejecting portion 60 are performed at the same time on the entire circumference, as the ejecting bodies, ejecting rods may be used in each of the holding grooves 22a to which the first side 41a and the second side 41b are respectively inserted to be movable between positions in the holding grooves 22a inward from the first side 41a or the second side 41b and positions at the openings of the holding grooves 22a. Further, like the pushing jig disclosed in the publication of the patent document 2, a pushing jig in which the same number of pushers as the holding grooves 22a are attached radially to the shaft may be used to simultaneously move the ejecting rods toward the openings of the holding grooves 22a.

The pushing portion 50 is not limited to a structure in which the lifting support bodies 52a and 52b are simultaneously lifted and lowered by the ball screw mechanism. For example, a mechanism may be employed in which one of the pushing bodies 54a and 54b supported by the lifting support bodies 52a and 52b comes into contact with the coil 40 and the other one moves afterward.

The coil 40 only needs to be deformable so that the distance between the first side 41a and the second side 41b increases when the pushing force is applied by the pushing portion 50 to the two coil ends 42a and 42b from the axial direction of the stator core 10, and there is no need for the coil ends 42a and 42b to both be shaped to be bulging. For example, a coil 40 may have only one of the two coil ends 42a and 42b be shaped to be bulging. However, a structure in which the coil ends 42a and 42b both have bulging shapes is preferable since the distance between the first side 41a and the second side 41b is smoothly increased when the pushing force is applied by the pushing portion 50.

The bulging shapes of the coil ends 42a and 42b do not have to be ridge-shaped. For example, the coil ends 42a and 42b may be formed to be semielliptical as shown in FIG. 12(a) or may be formed to have inclined portions that are continuous with the first side 41a and the second side 41b at the two sides of a horizontally extending distal end as shown in FIG. 12(b).

Figure 12C:
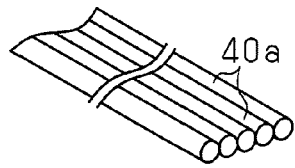
FIGS. 12(*a*) and 12(*b*) are partial schematic views showing the shape of a coil end in a further embodiment.

The conductor wire 40a forming the coil 40 is not limited to a rectangular wire and may be, for example, as shown in FIG. 12(c), a plurality of aligned conductor wires 40a having circular cross-sectional shapes. In other words, the coil 40 may be formed so that aligned round wires are wound into a predetermined shape. In this case, at least the portion fitted within the slot 12 is shaped. Thus, in a state in which a plurality of conductor wires 40a are formed in the coil 40, the conductor wires 40a are solidified by a resin or the like or an insulating sheet is wound around the conductor wires 40a to maintain the portions of the first side 41a and the second side 41b in the bundled shape. The conductor wires 40a may be aligned in a plurality of rows instead of just one row.

The structure that lifts and lowers the lifting support bodies 52a and 52b and the structure that moves the ejecting bodies 61a and 61b relative to the stator core 10 and the jig 20 are not limited to the structure including the ball screw mechanism that drives the drive portion with the motors 53 and M. For example, the lifting support bodies 52a and 52b may each be driven by a hydraulic cylinder and the support frame 31 may be driven by a hydraulic cylinder.

The lifting support bodies 52a and 52b may each be driven by a linear motor, and a linear motor may be used as the drive portion 32 that drives the support frame 31.

To prevent deformation of the coil 40 from the predetermined shape when pushed by the pushing portion 50, a guide may be arranged at the outer side of the coil 40, for example, a guide plate or a guide bar.

As long as the gear ratio between the gear body 34a and the gear 36a is the same as the gear ratio between the gear body 34b and the gear 36b, the two gear bodies 34a and 34b do not necessarily have to have the same diameter and the same number of teeth.

When the first side 41a and the second side 41b are set in a state inserted in the holding grooves 22a, the first side 41a and the second side 41b of each coil 40 may both be set to be located near the openings of the holding grooves 22a.

Instead of the state in which the first side 41a and the second side 41b are inserted to the holding grooves 22a, the insertion task of the coil 40 into the slots 12 may be started from a state in which one of the first side 41a and the second side 41b is inserted in a holding groove 22a of the jig 20, and the other one of the first side 41a and the second side 41b is inserted in a slot 12. In this case, a special shape is necessary so that the coil end does not interfere with the stator core 10 when arranging the jig 20 at the inner side of the stator core 10.

When setting the stator core 10 and the jig 20 in the support body 33 in a state in which the first sides 41a of the coils 40 are inserted in the slots 12, the second sides 41b are inserted in the holding groove 22a of the jig 20, and the coil ends 42a and 42b are both projected out of the two end portions of the stator core 10, whichever one of the stator core 10 and the jig 20 may be set in advance.

The stator S does not have to be one that inserts one first side 41a and one second side 41b in each of the slots 12, and the stator S may be one that inserts a plurality of (for example, two) first sides 41a and a plurality of second sides 41b in each of the slots 12. In this case, after inserting the coils 40 into the stator core 10 in the same manner as described above, the jig 20 is removed from the support body 33. Subsequently, after setting coils 40 that are to be inserted next between the stator core 10 and the jig 20, the series of insertion tasks described above are performed to complete the insertion of the coils 40.

The number of the slots 12 in the stator core 10 is not limited to thirty-six and may be greater than thirty-six (for example, forty-eight) or less than thirty-six (for example, twenty-four).

The number of the slots 12 arranged between the first side 41a and the second side 41b of a coil 40 is not limited to four. For example, the number may be set to three, which is less than four, or may be set to five, which is greater than four.

The coil 40 is not limited to a cassette type and may be formed, for example, so that a plurality of coils 40 are connected by connection wires.

The coil 40 is not limited to the lap winding as long as it forms a distributed winding coupled to two slots 12 and can be pressed from two sides by the pushing portion 50. For example, the coil 40 may form a wave winding and a concentric winding.

The stator core 10 only needs to be annular with the slots 12 having the openings 12a that open in the inner circumference and the slot pitch increasing from the opening 12a toward the bottom portion. The stator core 10 may be a segmented type core formed by joining a plurality of core segments. However, when using a segmented type core, the magnetic resistance increases, and the output of the electric rotating machine cannot be increased. It is thus preferable that a segmented type core not be used.

When applying pushing force with the pushing portion 50 and ejecting force with the ejecting portion 60 to some of the coils while repeating this task over the entire circumference, the stator core 10 and the jig 20 may be rotated by a predetermined amount in a state in which the pushing portion 50 and the ejecting portion 60 do not come into contact with the coil 40. In other words, whenever rotating the stator core 10 and the jig 20 by a predetermined amount, the lifting support bodies 52a and 52b are moved to space apart the pushing bodies 54a and 54b from the coil 40 and space apart the ejecting bodies 61a and 61b from the coil 40. Then, the stator core 10 and the jig 20 are rotated by a predetermined amount.

The invention claimed is:

1. A manufacturing method of a stator for an electric rotating machine, the manufacturing method comprising the steps of:

preparing an annular stator core including a plurality of slots arranged along a circumferential direction, wherein each of the slots includes an opening that opens in an inner circumference of the stator core, and a slot pitch between adjacent ones of the slots increases toward outside in a radial direction of the stator core;

preparing the plurality of coils, wherein each of the coils is formed in advance from a conductor wire and includes two coil ends, a first side, and a second side, and the first side and the second side are shaped to a form that fits within the slots of the stator core;

preparing a jig that can be arranged at a radially inner side of the stator core, wherein the jig includes a plurality of holding grooves, which are respectively opposed to the openings in a state arranged at the radially inner side of the stator core, and two end surfaces, which are located on two axial ends of the jig;

setting each of the coils to the jig so that at least one of the first side and the second side is inserted in the holding groove of the jig and the two coil ends protrude outward in an axial direction of the jig from the two end surfaces;

arranging the jig at the radially inner side of the stator core; and inserting the first side and the second side into the slots of the stator core by applying a force with an ejecting portion to the coil that ejects at least one of the first side and the second side inserted in the holding groove out of the holding groove and into a corresponding one of the slots, while applying a pushing force with a pushing portion to the two coil ends from an axial direction of the stator core and increasing the distance between the first side and the second side of the coil.

2. The manufacturing method according to claim 1, wherein the first sides and the second sides of the coils are both inserted in the holding grooves of the jig.

3. The manufacturing method according to claim 1, wherein a rectangular wire is used as the conductor wire.

4. The manufacturing method according to claim 1, wherein the two coil ends are each formed to have a bulging shape.

5. The manufacturing method according to claim 1, wherein the application of the pushing force by the pushing portion and the application of the ejecting force by the ejecting portion are performed at the same time on the entire circumference.

6. The manufacturing method according to claim 1, wherein the application of the pushing force with the pushing portion and the application of the ejecting force with the ejecting portion are performed on some of the coils and repeated throughout the entire circumference.

7. The manufacturing method according to claim 1, wherein a location in the ejecting portion where force is applied to the coil is rotatable about an axis extending in an axial direction of the stator.

8. The manufacturing method according to claim 1, wherein the coil is of a cassette type.

* * * * *